United States Patent
Readman

(10) Patent No.: US 8,757,589 B2
(45) Date of Patent: Jun. 24, 2014

(54) COUPLING ASSEMBLY WITH VALVES

(75) Inventor: Matthew Joseph Readman, Manchester (GB)

(73) Assignee: Self Energising Coupling Company Limited (GB)

( * ) Notice: Subject to any disclaimer, the term of this patent is extended or adjusted under 35 U.S.C. 154(b) by 1304 days.

(21) Appl. No.: 12/523,584

(22) PCT Filed: Jan. 21, 2008

(86) PCT No.: PCT/GB2008/050039
§ 371 (c)(1),
(2), (4) Date: Oct. 8, 2009

(87) PCT Pub. No.: WO2008/087457
PCT Pub. Date: Jul. 24, 2008

(65) Prior Publication Data
US 2010/0090150 A1    Apr. 15, 2010

(30) Foreign Application Priority Data
Jan. 19, 2007  (GB) .................................. 0701054.9

(51) Int. Cl.
*F16L 37/28*    (2006.01)
(52) U.S. Cl.
USPC .................. 251/149.1; 251/149.8; 251/149.9; 137/614.03; 137/614.04
(58) Field of Classification Search
USPC ............. 251/149, 149.1, 149.6, 149.8, 149.9; 137/614, 614.02–614.05; 285/307, 285/314–316, 321
See application file for complete search history.

(56) References Cited

U.S. PATENT DOCUMENTS

| | | | | |
|---|---|---|---|---|
| 2,471,237 A | * | 5/1949 | Pasturczak | 137/614.03 |
| 2,553,680 A | * | 5/1951 | Scheiwer | 137/596 |
| 2,714,518 A | | 8/1953 | Balass | |
| 2,684,839 A | * | 7/1954 | Rice | 173/126 |
| 2,753,195 A | * | 7/1956 | Palmer | 137/614.03 |
| 2,946,605 A | | 7/1960 | Mosher | |
| 3,613,726 A | | 10/1971 | Torres | |
| 4,029,125 A | * | 6/1977 | Steydle et al. | 137/614.06 |
| 4,124,228 A | | 11/1978 | Morrison | |
| 4,275,907 A | * | 6/1981 | Hunt | 285/18 |
| 4,832,080 A | | 5/1989 | Smith, III | |

(Continued)

FOREIGN PATENT DOCUMENTS

CH    352205 A    2/1961
EP    0681137 A2    11/1995

(Continued)

*Primary Examiner* — John K Fristoe, Jr.
*Assistant Examiner* — Marina Tietjen
(74) *Attorney, Agent, or Firm* — Shumaker, Loop & Kendrick, LLP

(57) ABSTRACT

A valve assembly comprises male and female coupling members that are connectable by inserting a probe of the male member into a socket of the female member. A fluid passageway within the female member has an aperture within the socket that is open and closed by a first closing member that moves within the socket. A fluid passageway within the male member has an aperture on the probe that is open and closed by a second closing member. When mated fluid flows between the two fluid passageways. The female member includes a first cage. During insertion of the probe into the socket, the first cage releasably locks the first closing member to the probe such that the cage carries any separation forces created due to the pressure of the fluid within the passageways.

12 Claims, 15 Drawing Sheets

(56) References Cited

U.S. PATENT DOCUMENTS

| | | | |
|---|---|---|---|
| 4,949,745 A * | 8/1990 | McKeon | 137/15.09 |
| 5,072,755 A * | 12/1991 | Wilcox | 137/614.03 |
| 5,385,169 A * | 1/1995 | Odelius | 137/614.03 |
| 5,482,082 A * | 1/1996 | Turner et al. | 137/614.03 |
| 5,694,991 A * | 12/1997 | Harris et al. | 141/346 |
| 6,679,472 B2 | 1/2004 | Baugh | |
| 2004/0074541 A1 * | 4/2004 | Sharpe | 137/614.04 |
| 2009/0261577 A1 * | 10/2009 | Readman | 285/99 |

FOREIGN PATENT DOCUMENTS

| | | |
|---|---|---|
| EP | 0688992 A2 | 12/1995 |
| GB | 2329945 A | 4/1999 |
| WO | PCT/GB2008/050039 | 7/2008 |

* cited by examiner

COUPLING ASSEMBLY WITH VALVES

TECHNICAL FIELD AND BACKGROUND OF THE INVENTION

The present invention relates to a valve assembly and in particular, although not limited to, a valve assembly for opening and closing the end of fluid passageways. The present invention further extends to a method of opening and closing a valve assembly.

It is a common requirement in many industries to be able to open and close the ends of fluid passageways. Fluid passageways require opening and closing in a variety of circumstances, for instance before/after the coupling/decoupling of two fluid passageways (e.g. pipes or hoses). It is particularly desirable to combine the opening and closing of the valves with coupling and decoupling of the two fluid passageways, such that when the fluid passageways are decoupled the valves are closed and when the fluid passageways are coupled the valves are opened.

WO 2006/005949 discloses various valve embodiments that open and close the fluid passageways, wherein the opening and closing of the valves is initiated by the coupling and decoupling respectively of a male and a female coupling member. A closing member operated by a spring closes the fluid passageways. In high pressure applications the spring is required to store a large amount of energy in order to urge the closing member closed against the pressure of the fluid. This occurs when the couplings are broken whilst pressurised fluid is contained within the coupling (e.g. during so called 'hot break' conditions). If the springs could not close the apertures against the pressurised fluid when the couplings are decoupled, decoupling could only occur in 'dry' conditions. Moreover, when one or both of the decoupled fluid passageways contain pressurised fluid (e.g. during so called 'hot make' conditions), the force required to couple the coupling members is dependent on the pressure of the fluid. In high pressure applications, this coupling force may be unachievable by spring loaded means thus known couplings can only be made when they are dry. Accordingly, in a wide number of applications, the coupling assembly is capable of dry coupling only.

BRIEF SUMMARY OF THE INVENTION

It is an object of the present invention to attempt to overcome at least one of the above or other disadvantages.

According to a first aspect of the present invention there is provided a female member which, with a male member, forms a valve assembly wherein:
the male member includes a probe with at least one first fluid passageway, wherein the or each fluid passageway has at least one exit aperture on a side face of the probe; and
the female member includes a socket for receiving the probe of the male member, at least one second fluid passageway wherein the or each fluid passageway has at least one exit aperture arranged on an internal side face of the socket, at least one first closing member that is freely moveable between an open position in which the or each exit aperture is at least partially unobstructed and a closed position in which the or each exit aperture is fully obstructed, and a first securing means for releasably securing the first closing member to the probe in order to restrict relative movement between said first closing member and probe.

Preferably the valve assembly may be opened and closed by coupling the male and female members. During coupling the socket may receive the probe by relative movement along a first direction. The members may be decoupled by relative movement along a second direction, the second direction being opposed to the first. Insertion of the probe into the socket may cause the first closing member to move towards its open position. The first closing member may be caused to move towards its open position by abutment between the probe and the closing member. The abutment may be between distal ends of the probe and closing member.

Preferably during coupling the first securing means may restrict relative movement between the first closing member and probe before the or each exit aperture of the socket is opened. Additionally, during de-coupling the first securing means may restrict relative movement between the first closing member and probe until after the or each exit aperture of the socket is closed. The first securing means restricts the relative movement such that it carries any separation forces generated during coupling or de-coupling. Preferably the first securing means restricts the first closing member from moving relatively away from the probe. The first aspect thereby enables the male and female members to be coupled and de-coupled without generating a net separation force even when both the or each first and second fluid passages contain pressurised fluid.

Preferably the movement of the first closing member towards the open position may cause the first securing means to engage the probe. Additionally movement of the first closing member towards the closed position may cause the first securing means to disengage the probe. The first securing means may comprise two parts wherein at least one of the parts is pivotal towards or away from the other in order to engage and disengage the probe. Preferably both parts may be pivotally moveable towards and away from each other. The two parts may be biased away from each other in order to be biased towards the disengaged arrangement. The two parts may be biased by an elastic member arranged about the two parts and to one side of the pivot points. The elastic member may be a spring. Alternatively, the two parts may be biased by a resilient member that is attached to the distal ends of the two parts. The resilient member may be a leaf spring. The resilient member may enable the pivoting of the two parts.

Preferably the pivot axis of the first securing means is locked fast with respect to the first closing member. Accordingly as the closing member is caused to move by insertion of the probe into the socket, the first securing means is caused to move with it. Preferably the female member may comprise a constant internal boundary, said boundary being fixed relative to the socket, and the first securing means may include a section that includes a varying outside boundary, wherein as the first securing means is moved relative to the internal boundary, the internal boundary contacts a different part of the varying outside boundary. The internal boundary may comprise the internal rim of a tube. Accordingly as the first closing member is caused to move towards the open position, the first securing means is caused to be drawn into the tube and abutment between the internal rim and external diameter causes the first securing means to engage the probe.

Preferably the first securing means includes a lock to stop the closing member from moving towards the open position unless the male member is being inserted. Accordingly the or each aperture in the female member cannot be opened unless the female member is coupled with the male member.

Preferably the male member includes a second closing member arranged about the probe. The second closing member may be movable between an open position in which the or each exit aperture of the probe is at least partially unobstructed and a closed position in which the or each exit aperture of the probe is fully obstructed. The second closing member may be freely movable. Preferably the female member includes a second securing means for releasably securing the socket to the second closing member in order to restrict relative movement between said socket and second closing member. Preferably during coupling the second securing means may restrict relative movement between the second closing member and socket before the or each exit aperture of the probe is opened. Additionally, during de-coupling the second securing means may restrict relative movement between the second closing member and socket until after the or each exit aperture of the socket is closed. The second securing means may restrict the second closing member from moving relative to the socket such that the second closing member closes the or each aperture in the probe before the second securing means releases the second closing member and any forces that are generated by the coupling/decoupling of the members and that act to urge the second closing member away from the socket are carried by the second securing means. The second securing means may lock the second closing member to the socket. The first aspect thereby enables the male and female members to be coupled and de-coupled without any fluid within the or each first and second passageways being lost since the members cannot be decoupled without the first and second closing members being in their closed positions.

Preferably the second securing means may be caused to engage the second closing member by movement of the first securing means towards an engaged position. Additionally the second securing means may be caused to disengage the second closing member by movement of the first securing means away from the engaged position. The second securing means may be slidable relative to the first securing means. The second securing means may comprise two parts wherein at least one of the parts is pivotal towards and away from the other in order to engage and disengage the probe. Preferably both parts may be pivotally moveable towards and away from each other. The two parts may be biased away from each other in order to be biased towards the disengaged arrangement. The two parts may be biased by an elastic member arranged about the two parts and to one side of the pivot points. The elastic member may be a spring. Alternatively, the two parts may be biased by a resilient member that is attached to the distal ends of the two parts. The resilient member may be a leaf spring. The resilient member may enable the pivoting of the two parts.

Preferably the pivot axis of the second securing means is locked fast with respect to the socket. Accordingly as the probe is inserted into the socket the second closing member is caused to move towards its open position by abutment between the socket and closing member. Additionally as the probe is withdrawn from the socket, the second closing member is caused to move towards its closed position by the engagement of the second closing means.

Preferably the male member includes a lock to prevent the second closing member from moving unless the male and female members are being coupled. The lock may be released by engagement between the second securing means and second closing member. Accordingly the or each aperture in the male member can not be opened unless the male member is coupled with the female member.

Preferably the female member and male member may comprise female and male coupling members respectively. The coupling members may be releasably interconnectable. When the two coupling members are coupled fluid may pass between the two fluid passages. The coupling members may be decoupled by withdrawing the probe from the socket. When the probe is inserted in the socket the or each exit aperture in the probe's side face may be coincident with the or each exit aperture in the socket's internal face.

Preferably the female member may include alignment features to cooperate with features on the male member in order to ensure the correct alignment of the probe in the socket. The alignment features may include a protrusion and a corresponding slot in one of the male or female members respectively. Preferably the coupling may include a breakout mechanism. The breakout mechanism may resist decoupling of the members. The breakout mechanism may be a breakout pin. The breakout pin may be inserted, when the members are coupled, through a hole in the male member and an aligned hole in the female member. When coupled the aligned holes may be arranged between the axes of the two fluid conduits. The breakout pin may be removed to enable decoupling by an actuator, or manually, or the members may be decoupled by breaking the pin.

Preferably each closing member may include two sealing rings such that, when in their closed positions the sealing rings create a seal on either side of each aperture. The seals on each closing member may be the same size such that, when coupled and pressurised, no net separation force is generated.

When the male and female couplings include multiple fluid passageways, each passageway in the female member may include its own socket. Each socket may be closed by a closing member. Each closing member may be connected to the other so that the sockets are open and closed simultaneously. The male member may include a probe for each passageway. The probes may be connected to each other. A single closing member may close each of the probes.

Preferably the female member may be substantially in accordance with that herein described and with reference to the figures. Preferably the male member may be substantially in accordance with that herein described and with reference to the figures.

According to a second aspect of the present invention there is provided a male coupling member which, with a female coupling member (not itself part of this aspect) forms a valve assembly comprising:
   a probe; and
   at least one first fluid passageway, wherein the or each fluid passageway has at least one exit aperture on a side face of the probe; and
   at least one second closing member that is freely moveable between an open position in which the or each exit aperture is at least partially unobstructed, and a closed position in which the or each exit aperture is fully obstructed.

Preferably freely moveable means that the second closing member is unbiased towards its closed position.

The male member may be substantially the same as the male member according to the first aspect.

According to a third aspect of the present invention there is provided a female coupling member which, with a male coupling member (not itself part of this aspect), forms a valve assembly comprising:
   a socket for receiving a probe of the male coupling member;
   at least one second fluid passageway, wherein the or each fluid passageway has at least one exit aperture arranged on an internal side face of the socket;
   at least one first closing member that is freely moveable between an open position in which the or each exit aperture is at least partially unobstructed, and a closed position in which the or each exit aperture is fully obstructed; and a first securing means for releasably securing the first closing member to the probe in order to restrict relative movement between said first closing member and probe.

The female member may be substantially the same as the female member according to the first aspect.

According to a fourth aspect of the present invention there is provided a method of releasably interconnecting a male and female coupling member wherein the method comprises:

inserting a probe of the male member, said probe including at least one first fluid passageway wherein the or each fluid passageway has at least one exit aperture on a side face of the probe, into a socket of the female member, said socket including at least one second fluid passageway, wherein the or each fluid passageway has at least one exit aperture arranged on an internal side face of the socket; and causing a first securing means of the female member to releasably secure a first closing member of the female coupling member, said first closing member is moveable between an open position in which the or each exit aperture of the socket is at least partially unobstructed and a closed position in which the or each exit aperture is fully obstructed, to the probe such that the probe and first securing means are restrained from moving relative to each other.

Preferably the method comprises causing the first securing means to releasably secure the two parts when the closing member is in the closed position.

Preferably the method comprises causing a second securing means of the female member to releasably secure a second closing member of the male coupling member, said second closing member being moveable between an open position in which the or each exit aperture of the probe is at least partially unobstructed and a closed position in which the or each exit aperture is fully obstructed, to the socket when both the closing members are in closed positions.

The method may include causing the second securing means to secure the two parts by moving the probe towards the socket. The method may include causing the two closing members to move towards an open position by moving the probe further into the socket from the point at which both securing members secure their respective closing members.

Preferably the method may comprise coupling the coupling members as herein described and wherein the male and female members are substantially in accordance with the first aspect of the present invention.

BRIEF DESCRIPTION OF THE FIGURES

Various embodiments of the present invention will now be described, by way of example, and with reference to the following drawings in which.

DETAILED DESCRIPTION OF THE INVENTION

Figure 1:
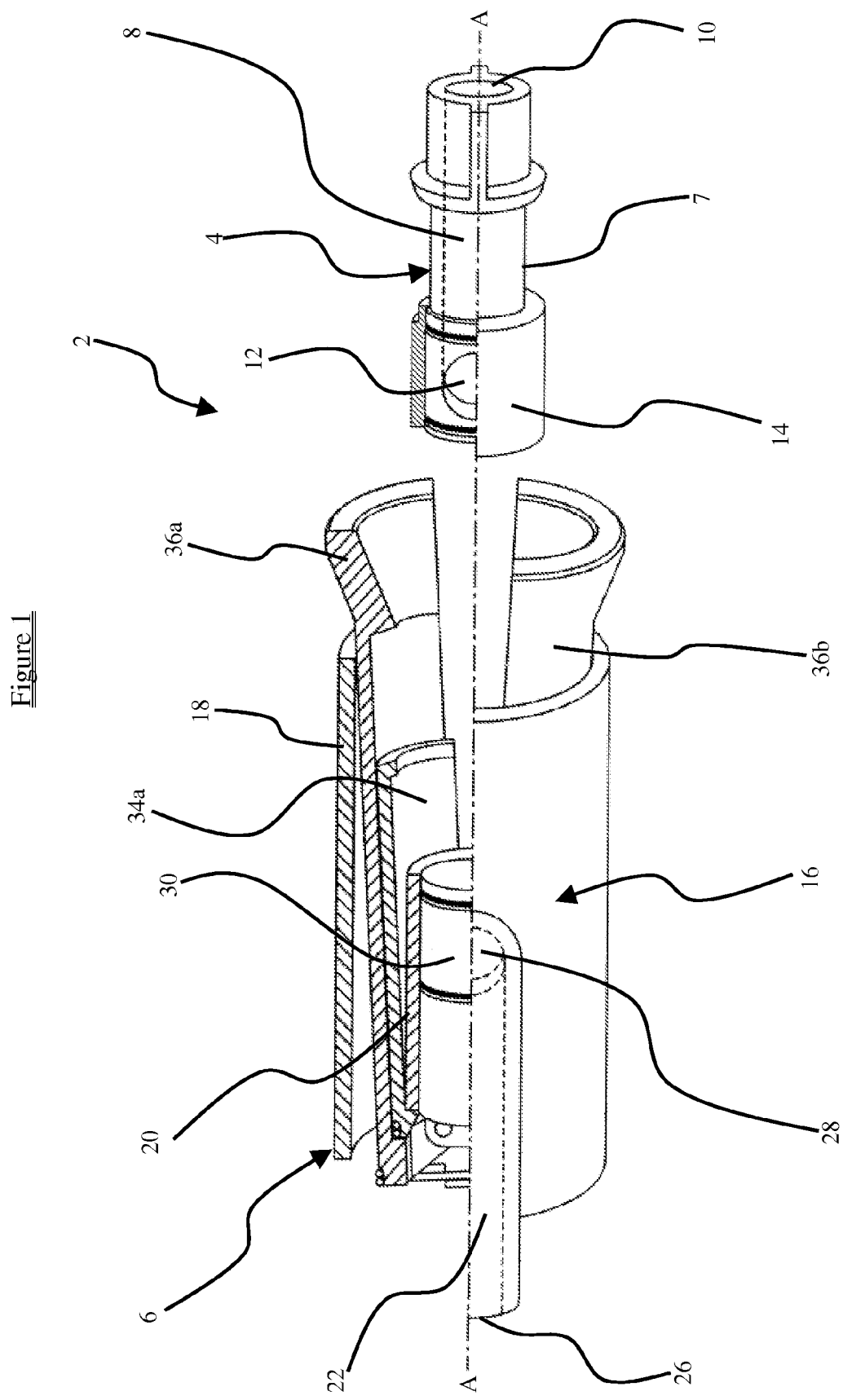
FIG. 1 is a perspective, partial cut away, side view of a male and female coupling member according to a first embodiment of the present invention in an uncoupled arrangement.

FIG. 1 shows a valve assembly 2 in an uncoupled arrangement. The valve assembly 2 comprises a male member 4 and a female member 6.

The male member 4 is of generally cylindrical overall form and includes a probe 7. A fluid passageway 8 (shown dotted) extends through the probe between a first aperture 10, which is in communication with a first fluid conduit (not shown), and a second aperture 12, which is arranged on a circumferential face of the probe, at the other end to the first aperture 10. A cylindrical sheath 14 (shown partly cut away in FIG. 1) surrounds the probe and is slidably mounted thereto. The sheath 14 is unbiased and freely slidable between an open position, in which the sheath 14 does not restrict the second aperture 12, and a closed position (shown in FIG. 1), in which the sheath 14 restricts fluid egress from the aperture 12.

The female member 6 includes a body 16. The body 16 includes an external tube 18, an internal tube 20, and a fluid passageway 22 (shown in dotted line in FIG. 1). The internal tube 20 defines a socket for receiving the probe 14. The fluid passageway 22 extends between a first aperture 26, which is in communication with a second fluid conduit (not shown), and a second aperture 28, which is arranged on an internal circumferential face of the socket, at the other end to the first aperture 26. A piston 30 is arranged to be slidably mounted within the socket. The piston is unbiased and free to slide between an open position, in which the piston 30 does not restrict the aperture 28, and a closed position, (shown in FIG. 1) in which the piston 30 restricts fluid egress from the aperture 28. An inner shell 34 is formed of two shell pieces 34a and 34b (34b is not visible in the drawings). The inner cages 34a and 34b are pivotally connected at one end to the body 16. An outer cage 36 is formed of two cages 36a and 36b. The outer cages 36a and 36b are pivotally connected at one end to the piston 30. The distal end of each outer cage includes an outwardly flared or frusto conical section.

As shown in FIG. 1, when uncoupled the sheath and piston are in their closed positions. Accordingly, pressurized fluid may fill the fluid passageways, with the fluid being restricted from egressing the apertures 12 and 28, due to the sheath and piston being in the closed positions.

Figure 2:
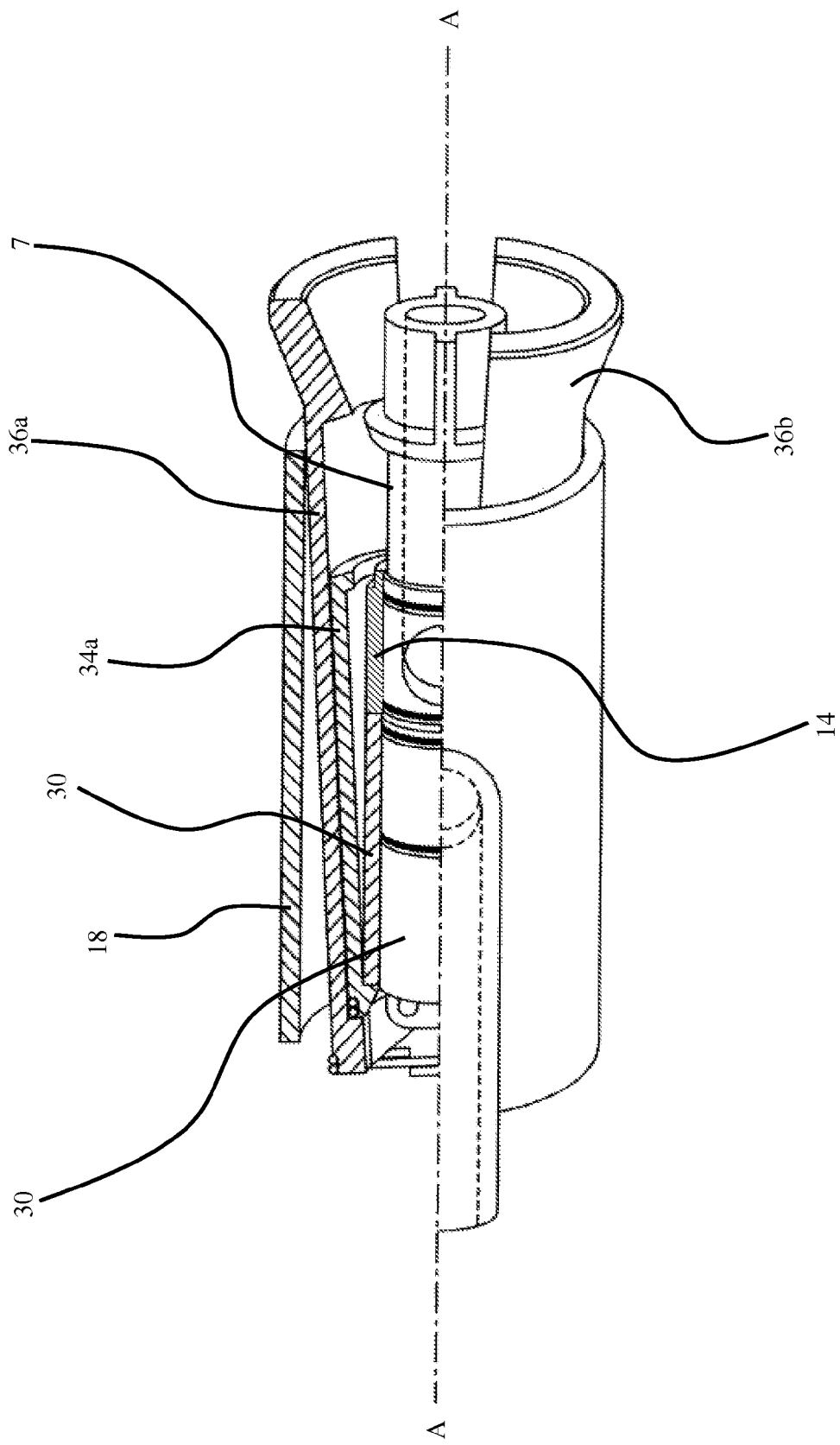
FIG. 2 is a perspective, partial cut away, side view of the first embodiment in an intermediate coupled arrangement.

The male member 4 can be coupled to the female member 6 by relative movement of the probe 7 toward the socket along a coupling axis A:A. FIG. 2 shows the valve assembly 2 in an intermediate coupled position, wherein the distal ends of the probe 7 and sheath 14 abut the piston 30 and internal tube 20 respectively. As the male member 4 is moved further along the coupling axis with respect to the socket, the piston 30 and sheath 14 begin to move towards their open positions. The movement of the piston 30 causes the cages to be drawn axially in to the external tube 18. In doing so, external faces of the frusto conical sections engage the diameter of the external tube 18 thereby causing the two outer cages 36a and 36b to pivot towards each other. The inner cages 34a and 34b fit inside the outer cages and are thereby also caused to pivot towards each other. As the outer cages 36a and 36b move towards each other, they engage the probe 7 and accordingly lock the probe 7 and piston 30 together. As the inner cages 34a and 34b move towards each other, they engage the sheath 14 and accordingly lock the sheath 14 and internal tube 20 together.

Figure 3:
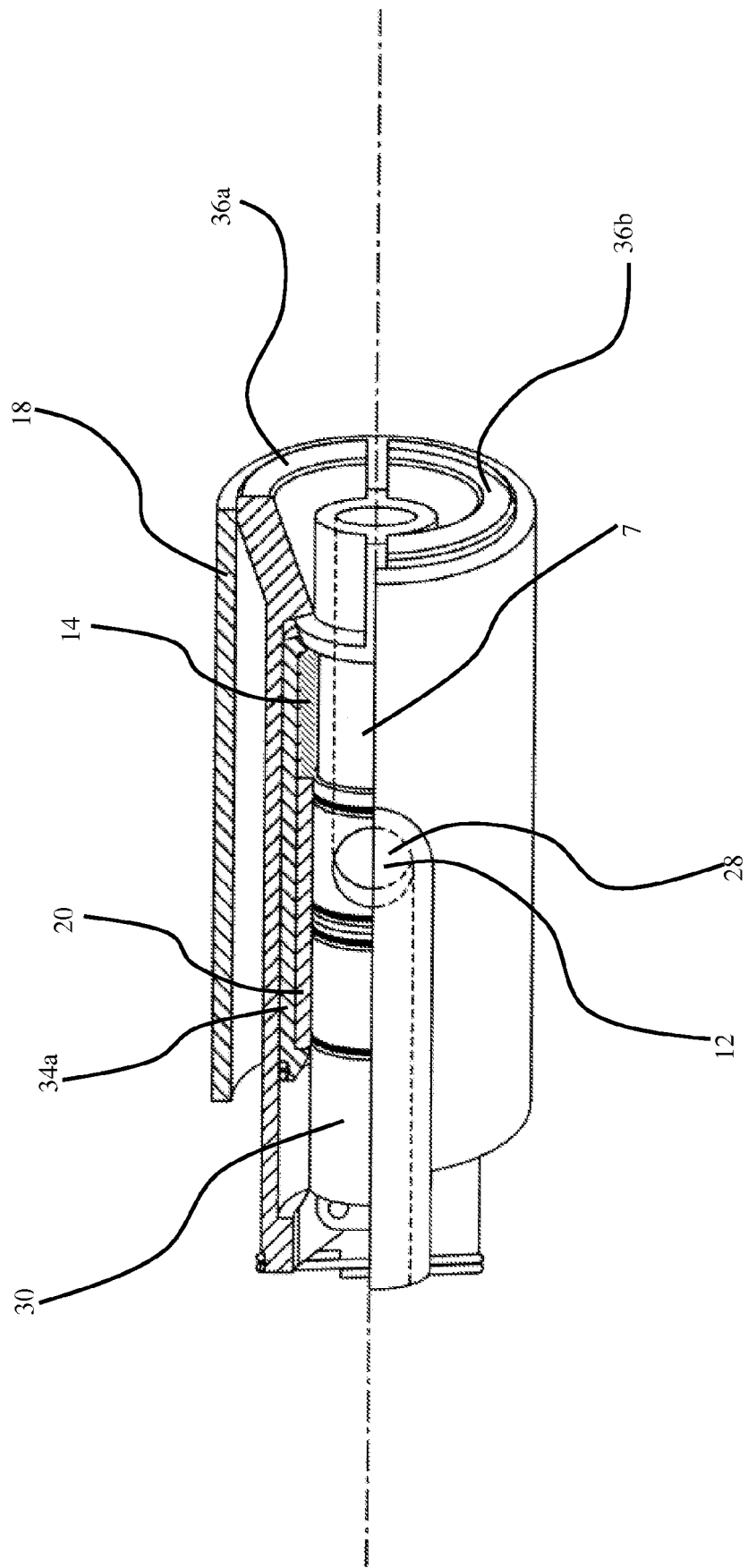
FIG. 3 is a perspective, partial cut away, side view of the first embodiment in a coupled arrangement.

The probe 7 is inserted into the socket until it reaches a coupled position, as shown in FIG. 3. In the coupled position, the aperture 12 in the probe 7 is in communication with the aperture 28 in the socket and the sheath 14 and piston 30 are in their open positions. Consequently, fluid may flow between the two fluid passageways 8, 22. For instance, pressurised fluid in the second fluid conduit (not shown) flows along the fluid passageway 22 and out of the aperture 28 in the face of the socket. The fluid is retained in the socket by sealing rings 52, 58 on the probe. The fluid pressure acts on sealing ring 58 to expel the probe and on sealing ring 52 to draw it further in to the socket. Because the sealing rings are the same size and the pressure equal, a zero net force is created. The fluid may then enter the fluid passageway 8 through aperture 12 before flowing into the first fluid conduit (not shown). When the probe 7 is withdrawn from the socket, the engagement between the inner cage 34 and the sheath 14 ensures that the sheath returns to the closed position. Likewise, the engagement between the probe 7 and outer cage 36 ensures that the piston returns to the closed position. Furthermore, because during coupling and de-coupling, the probe 7 and piston 30 are locked together until the apertures 12, 28 are fully closed, no separation force is generated during coupling and de-coupling; even when pressurised fluid remains in the fluid passageways.

The various parts of the embodiment will now be described in more detail.

Figure 4:
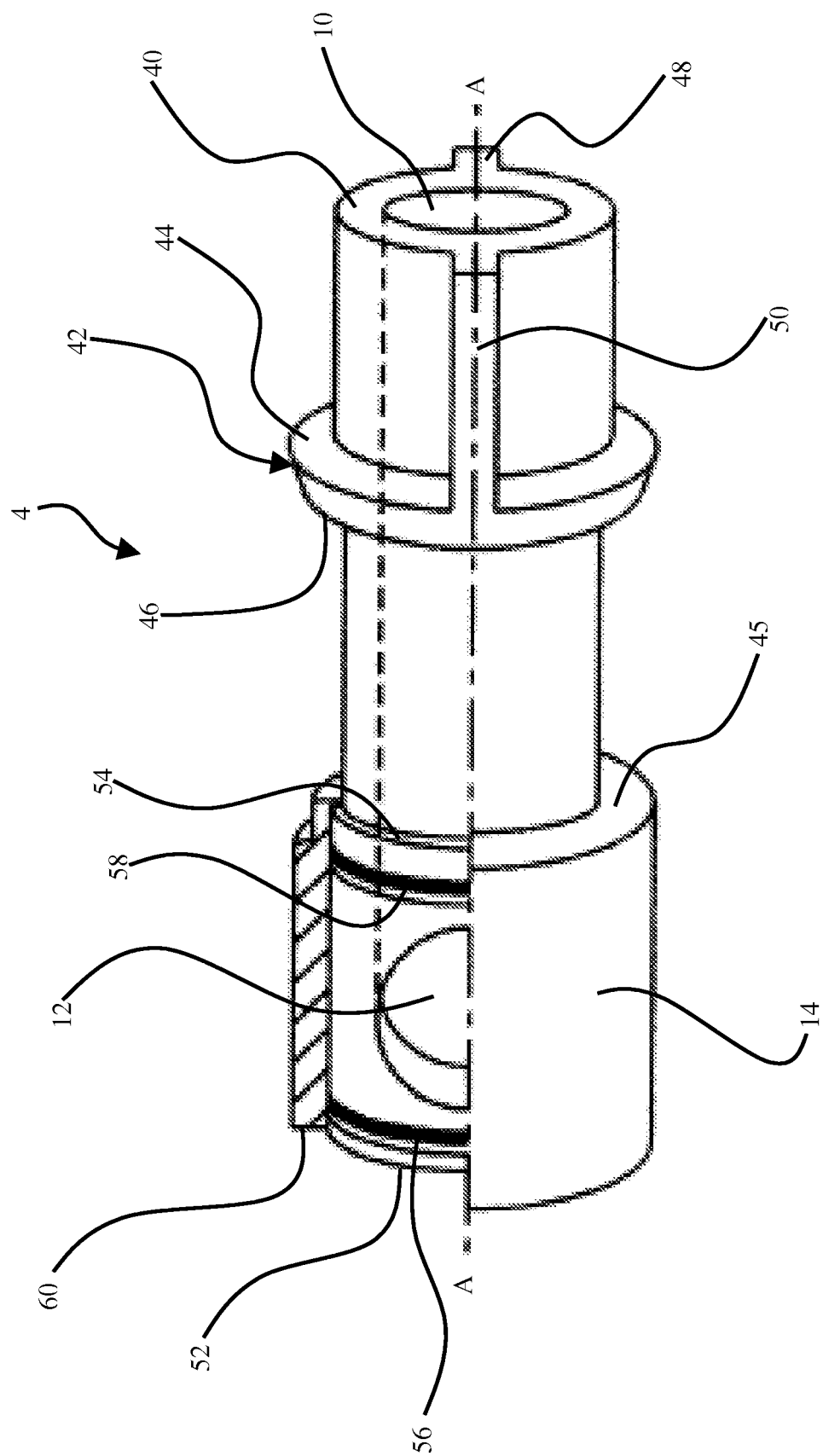
FIG. 4 is an enlarged perspective partial cutaway, side view of the male member of the first embodiment.

FIG. 4 shows an enlarged view of the male member 4. The probe body 7 is generally cylindrical with an axis coincident with the coupling axis A-A.

The first fluid access aperture 8 is arranged on a distal end face 40 of the male member. A circumferential flange 42 extends about the probe 7 and is spaced axially from the end face 40. The circumferential flange 42 comprises two opposed radial faces 44, 46. Radial face 44 faces towards the end face 40 and is chamfered such that the intersection between the radial face 44 and the probe 7 is closer to the end face 40 than the circumference at the rim of the flange is to the end face. Radial face 46 faces away from the end face 40 and at a right angle to the probe.

Two ridges 48, 50 extend axially along the outside of the probe and between the circumferential flange 42 and end face 40. The ridges 48 and 50 are in the same radial plane and arranged on opposing sides of the probe.

The probe extends from the circumferential flange 42, away from the end face 40, to a distal end 52 in two sections. The end section has an increased diameter to the middle section that is nearest the circumferential flange. Accordingly, a hip 54 is created at the intersection of the two sections.

The second aperture 12 is arranged on a circumferential face of the large diameter section. Located either side of the aperture 12 are two annular sealing rings 56, 58.

Each annular sealing ring is housed in an annular groove formed in the large diameter section of the probe 7.

The sheath 14 is arranged to fit about the distal end region of the probe. Accordingly, the sheath includes a stepped hole along its central axis, which forms an internal shoulder. The stepped hole includes a section with a diameter sized to fit about the larger diameter section of the probe and an end section with a smaller diameter hole sized to fit about the middle section of the probe 7. The external profile of the sheath remains cylindrical apart from a tapered end region 45. The tapered end region 45 includes the smaller diameter hole. The taper is such that the diameter reduces towards the end of the sheath.

When the sheath 14 is assembled about the probe 7 it is freely slidable along the coupling axis A-A. The sheath is moveable towards the open position by sliding the sheath relative to the probe and away from the distal end face 52. When in the open position the sheath is delimited by abutment between the tapered end region 45 of the sheath and the radial face 46. In the open position a distal end 60 of the sheath, which is furthest from the circumferential flange, moves clear of the sealing ring 58. The sheath 14 is slidable towards the closed position by sliding the sheath relative to the probe and towards the distal end face 52. When in the closed position, the sheath 14 is delimited by abutment between the hip 54 and internal shoulder of the sheath. In the closed position, the distal end 52 of the probe and the distal end 60 of the sheath are arranged in the same plane such that the male member may be easily wiped.

In the closed position the two sealing rings 56, 58 create a seal between the sheath 14 and probe 7 such that the second aperture 12 is closed by the sheath 14. Accordingly, pressurised fluid that fills the passageway is restricted from egressing the aperture 12.

Although the fluid passageway 8 is shown as extending from the first aperture 10 coincident to the coupling axis before turning through ninety degrees at an elbow, in order to exit the probe through the second aperture 12, it will be appreciated that the fluid passage 8 may follow any continuous path between the two apertures 10, 12.

Figure 5:
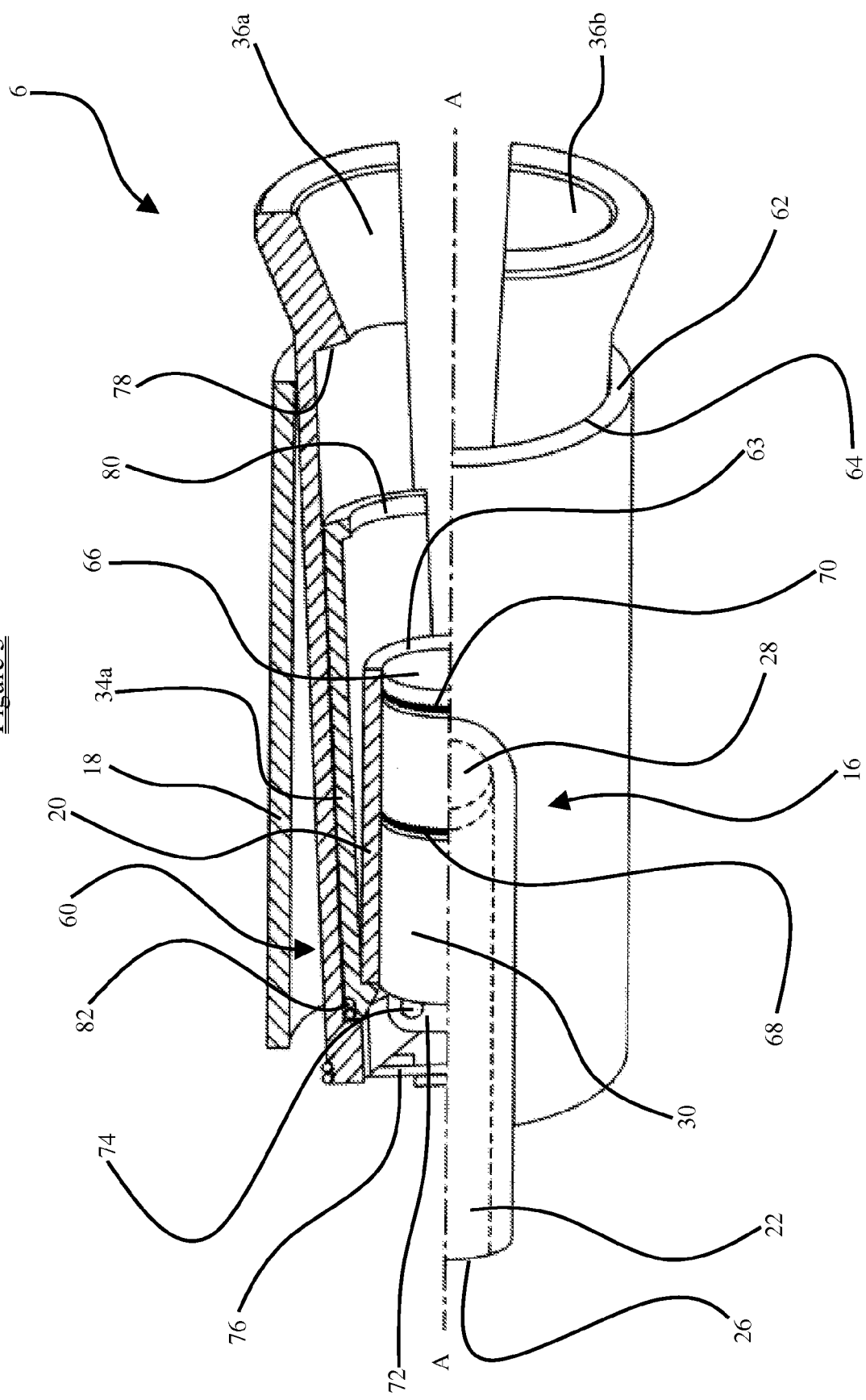
FIG. 5 is an enlarged perspective partial cutaway, side view of the female member of the first embodiment.

FIG. 5 shows an enlarged view of the female member 6. The body 16 may be integrally formed. The external tube 18 is substantially cylindrical and defines a cylindrical recess 60. The external tube has a distal end 62 and an inner distal rim 64. The internal tube 20 is arranged within the external tube's recess 60 and such that the internal tube's axis is coincident with the axis of the external tube 18. The internal tube 20 includes a distal end 63. The internal tube 20 is held to the external tube 18 by a bridge (not visible in the figures) that extends between the two tubes. The bridge only fills a portion of the recess 60. The fluid passageway 22 is formed in a protrusion that extends from the external tube 18 as part of the body 16. The passageway 22 extends from the first fluid passageway 26 before bending through ninety degrees at an elbow, where it extends through the bridge and to the second aperture 28.

The piston 30 is a cylindrical rod sized to fit within the socket defined by the internal tube 20. The piston 30 includes a distal end 66 and two annular sealing rings 68, 70 that are housed in annular grooves formed in the piston. A plate 72 extends from the second end of the piston. The plate 72 includes two pivot points. Outer cage 36a is pivotally connected to the piston at the pivot point 74 in the plate 72. Outer cage 36b is pivotally connected to the piston at the other pivot point (not shown). The pivot points are spaced either side of the coupling axis such that, as will become clear, the pivot point of each outer cage 36a, 36b is in an axial plane with the axis of the outer cage when in a clamped position.

The two outer cages 36a and 36b are arranged substantially within the recess 60. To one side of the pivot points 74, the ends of the two cages 36a, 36b are biased to each pivot towards one another by a spring 76 that fits about both cages. Accordingly, the two cages are biased to an un-clamped position in which the cage ends on the other side of the pivots are biased away from each other. Each outer cage extends from the biased end to the frusto conical section on the opposing side of the pivot point. An internal shoulder 78 is formed at the start of the frusto conical section. The shoulder is angled so that it engages with the chamfered end of the sheath in order to provide a ramp affect as the male member is decoupled from the female member. The ramp affect urging the two outer cages apart. The two outer cages 36a, 36b can pivot towards each other. Pivoting each cage towards each other moves the two pieces 36a, 36b towards a clamped position in which the two cages form a constant circular cross section with a slit down either side. As will be seen, this slit allows the two cages to clamp about the probe 7 and specifically accommodates the axial ridges 48, 50.

The inner cages 34a, 34b are each pivotally connected to the internal tube 20 at pivots (not shown). Each inner cage 34a and 34b includes a semi tubular section that includes an inwardly facing lip 80. The inwardly facing lip 80 is arranged to be spaced from the end of the internal tube. The two inner cages 34a, 34b are biased to pivot towards each other on one side of the pivots by a spring 82 that is arranged about the ends of the cages. The spring 82 is located in a recess to provide a flat profile. Accordingly, the inner cages 34a and 34b are biased to pivot towards an un-clamped position in which the ends of the inner cages on the opposing side of the pivots are biased away from each other. The inner cages are pivotal towards a clamped position by moving the ends on the opposite side of the pivot towards each other. When in the clamped position the two cages abut each other to create a constant circular cross section with a slit down each side to allow a positive clamping action.

The male 4 and female members 6 can be releasably coupled and decoupled by moving the two members relative to each other along the coupling axis. During insertion, the frusto conical section acts as a funnel for the probe 7 in order to ease alignment of the probe 7 and socket. As shown in FIG. 2, the distal end 52 of the probe abuts the distal end 66 of the piston and the distal end 60 of the sheath abuts the distal end 62 of the internal tube 20. In this position, the apertures 12 and 28 remain closed as the sheath 14 and piston 30 have not moved from their closed positions. As the probe 7 is inserted further into the socket the abutment between the probe 7 and piston 30 moves the piston towards its open position. Due to the annular sealing ring 70 being offset from the aperture 28, the piston 30 can move a small distance with the aperture 28 remaining closed. The movement of the piston causes the pivotal connections of outer cage 36 to move, thereby drawing the outer cage into external tube 18

The outer cage 36 is biased apart by the spring 76 and is restricted from pivoting further apart by abutment with the inner distal rim 64. As the outer cage 36 is drawn in to the external tube 18 the frusto conical section engages the inner distal rim 64 thereby causing the outer cages to pivot towards the clamped positions.

The arrangement of the sealing ring 70 is such that the outer cages are urged to their clamped position, prior to the sealing ring 70 moving past the aperture 28. In the clamped position, the outer cage 36 clamps the probe 7 by engagement of the internal shoulder 78 with the radial face 44. The axial ridges 48, 50 locate in the slit formed between the two outer cages 36a and 36b and assist in the correct alignment of the probe 7 in the socket.

The inner cage 34 is arranged inside the outer cage 36. The inner cages 34a and 34b are urged to pivot against the outer cages by the spring 82. Accordingly, as the outer cages 36 are pivoted towards the clamped position, so are the inner cages 34a and 34b. In the clamped position the inner cage clamps the sheath 14 to the socket by abutment between the lip 80 and chamfered end 45.

As the probe 7 continues to be inserted into the socket, the sheath 14 remains in position relative to the socket thereby opening the aperture 14. The outer cage 36 slides relative to the inner cage 34 with the piston opening the aperture 28. Normally, if pressurised fluid was within one or both of the fluid passageways 8, 22, the pressure would force the probe 7 out of the socket. However, because the probe 7 and socket cannot move away from each other because they are locked together by the outer cage 36 they act as one piece.

Accordingly, a zero net coupling force is created. Moreover the force required to couple the male and female coupling members is independent of the pressure of the fluid within the fluid passageways.

Insertion of the probe is stopped when the sheath 14 and piston 30 are fully opened by abutment between the sheath 14 and radial face 46.

When coupled it may be desirable to include a predetermined breakout strength to the assembly. Due to the annular sealing rings being of the same size, when coupled the pressure of the fluid acting on opposed sealing rings 56, 58 produces a zero net separation force. Accordingly the breakout strength is determined independently of the pressure within the fluid passages. The assembly can be decoupled by withdrawing the probe from the socket.

As the probe 7 is withdrawn, engagement of the radial face 44 and internal shoulder 78 causes the outer cage 36 to be withdrawn from the external tube 18 and also causes the piston 30 to move towards its closed position. Engagement of the lip 80 and sheath also causes the sheath 14 to move relative to the probe 7 towards its closed position. The apertures 12 and 28 are closed by the sheath and pistons respectively before the inner 34 and outer 36 cages release the sheath 14 and probe 7 respectively.

As the frusto conical section is withdrawn from the rim 64 of the external tube 18 the spring 76 causes the outer cages 36a and 36b to pivot away from each other thereby releasing the probe. The pivoting of the outer shell pieces towards the un-clamped position is primarily affected by the chamfer formed on the radial face 44. The chamfer on face 44 naturally urges the cages apart as the male member is withdrawn. Accordingly, if, for whatever reason, the springs fail to affect the separation of the shell pieces, the coupling does not lock-up.

As the outer cage 36 moves apart, the spring 82 causes the inner cage 34 to also move apart thereby releasing the sheath 14. The pivoting of the inner cages 34a and 34b is aided by the chamfer end 45 of the sheath.

Consequently, the male member 4 is decoupled from the female member 6, again without creating a separation force. Furthermore, the apertures are closed by the decoupling of the coupling members such that when the members are decoupled the valves are always shut.

The biasing of the inner and outer cages provides resistance against the movement of the cages without the presence of a male member.

Furthermore, the apertures 12, 28 are closed by the decoupling of the coupling members such that when the members are decoupled the apertures are always shut.

FIGS. 6-11 show a male member 4 and female member 6 of a valve assembly 2 according to a second embodiment, wherein the assembly incorporates various additional design features.

Figure 6:
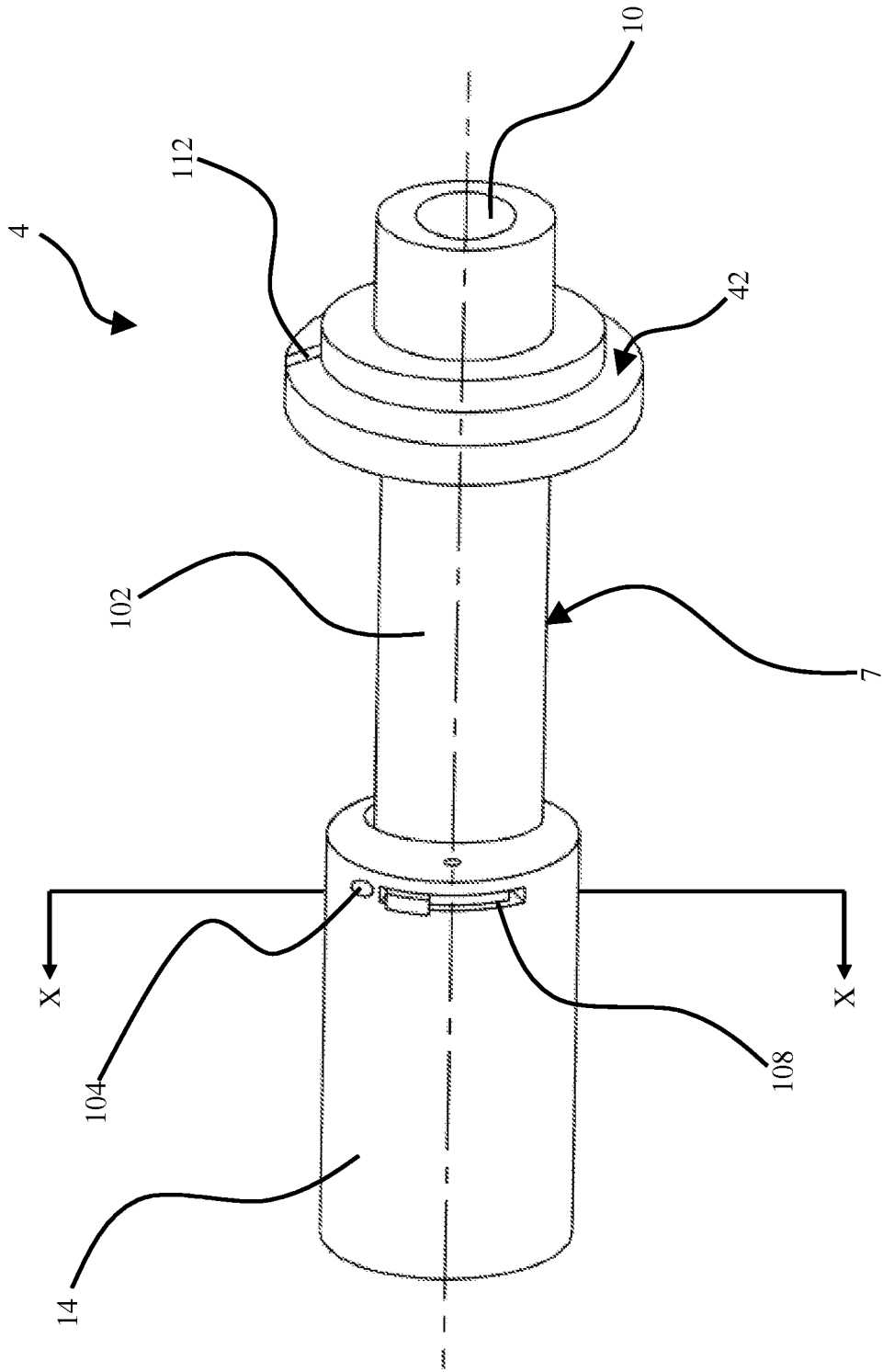
FIG. 6 is a perspective view of a male member according to a second embodiment.
Figures 7A, 7B:
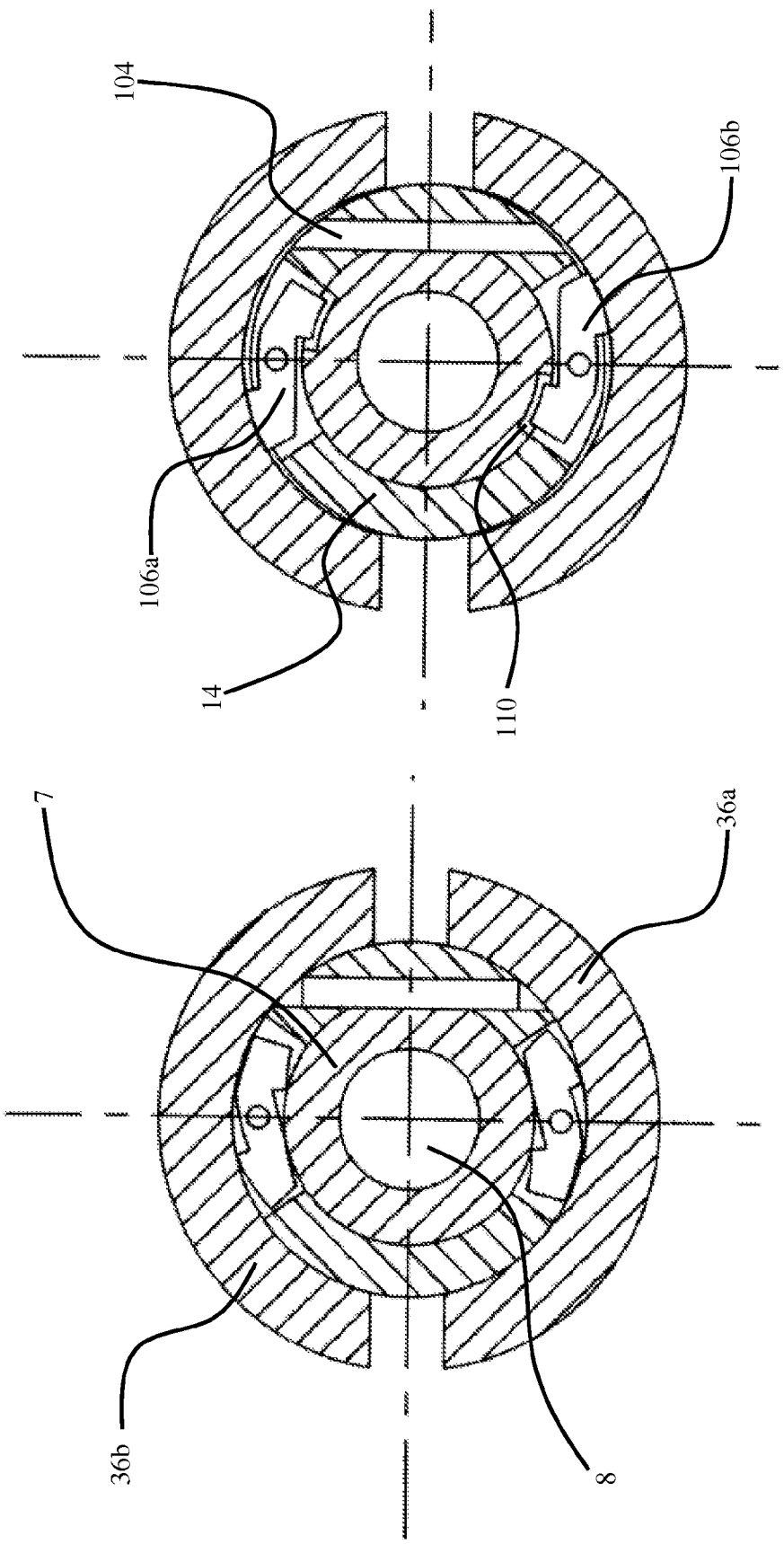
FIG. 7a is a section view along line X-X of FIG. 6 showing the male member being clamped by outer cages of a female member.
FIG. 7b is a section view along line X-X of FIG. 6 showing the male member surrounded by the outer cages of a female member in an unclamped arrangement.

The male member 4 is shown in FIGS. 6, 7a and 7b and includes a probe 7 that defines a fluid passageway 8, which extends between two fluid apertures 10,12 (12 is not shown), and a sheath 14. In the second embodiment the probe 7 does not include a hip in order to restrict the sheath from sliding from the end of the probe. Rather, the probe includes a flat machined along a middle section 102 of the probe 7. The sheath 14 includes a through hole 104. A pin (not shown) can be inserted through the hole. The hole 104 is arranged in the sheath such that when the pin extends through the hole, the pin restricts the internal diameter of the sheath. During assembly of the male member 4, the sheath 14 can be slid onto the probe. When the probe 7 is in a closed position (as previously described) the hole 104 is arranged adjacent the start of the flat section. Accordingly, the pin can be inserted, and, in use, abutment between the pin and end of the flat section stops the sheath 14 from moving past the closed position. The pin also slides against the flat during movement of the sheath and, due to abutment between the pin and the flat, rotational alignment of the sheath is provided. (i.e. it stops the sheath twisting about the probe 7).

It is advantageous to provide the sheath with a mechanism to lock the sheath in the closed position so that the sheath is inhibited from moving towards the open position apart from during coupling with a female member. Accordingly, pivoted latches 106a and 106b are provided on either side of the sheath. Each pivoted latch is arranged in a slot 108 formed in the sheath. The latches 106a, 106b are pivoted about their mid points and include protruding end regions. Each latch is biased to pivot such that a first protruding end region moves towards the probe. When the sheath is in the closed position, the first protruding end region aligns with a recess 110 formed in the probe and accordingly the biasing of the latches urges the first protruding end regions into engagement with the recesses. When the latches pivot into the recesses, the second protruding end region pivot away from the probe to project out of the slot 108.

When the probe is inserted into the female member (as previously described) outer cages 36a and 36b, shown in FIG. 7a and FIG. 7b, clamp around the outside of the sheath. In doing so the latches are forced to rotate against their biasing, and out of engagement with the recesses 110. Accordingly, the sheath becomes unlocked and is free to move towards the open position.

Circumferential flange 42 that provides the stop to the sheath in the open position (as previously described) includes a slot 112. The slot 112 runs radially. The slot engages with the female member in order to align the probe, as will be herein described.

Figure 9:
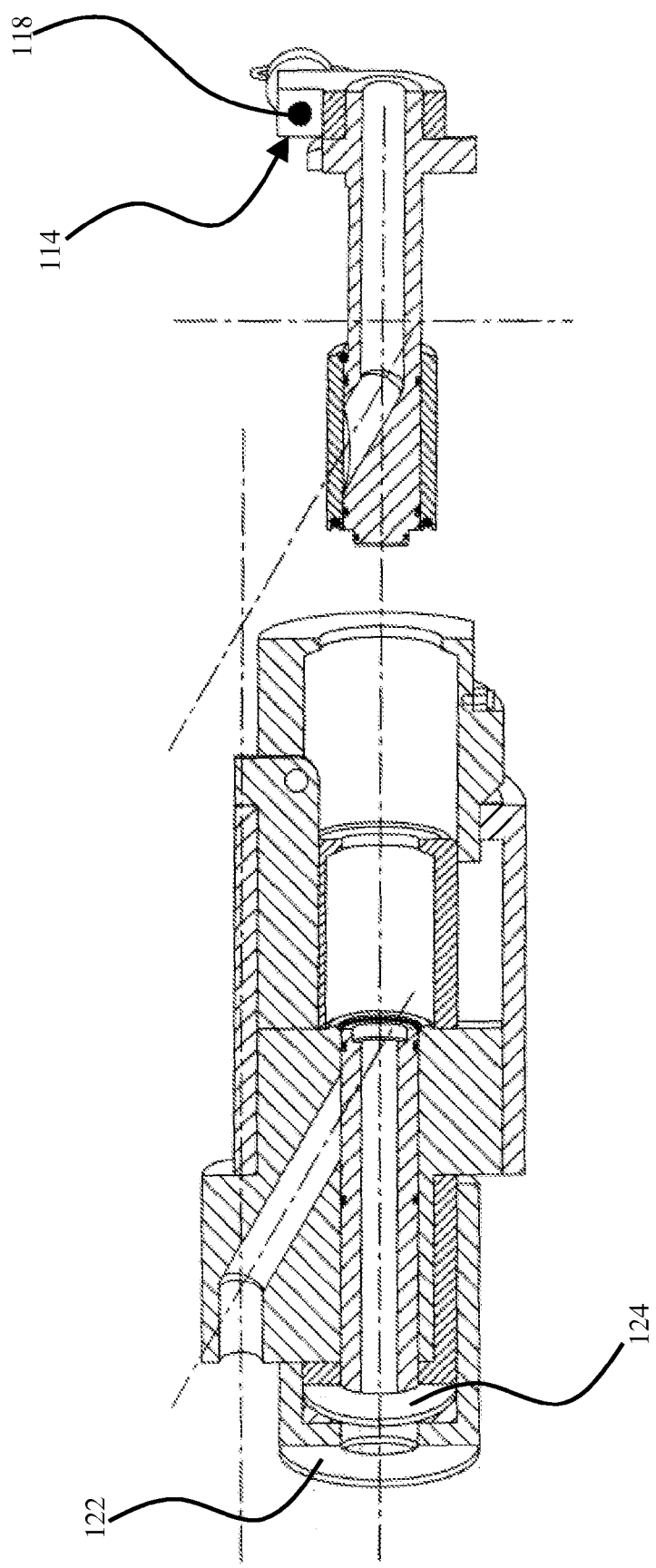
FIG. 9 is a sectioned, perspective side view of a male and female member of the second embodiment before coupling.
Figures 10A, 10B:
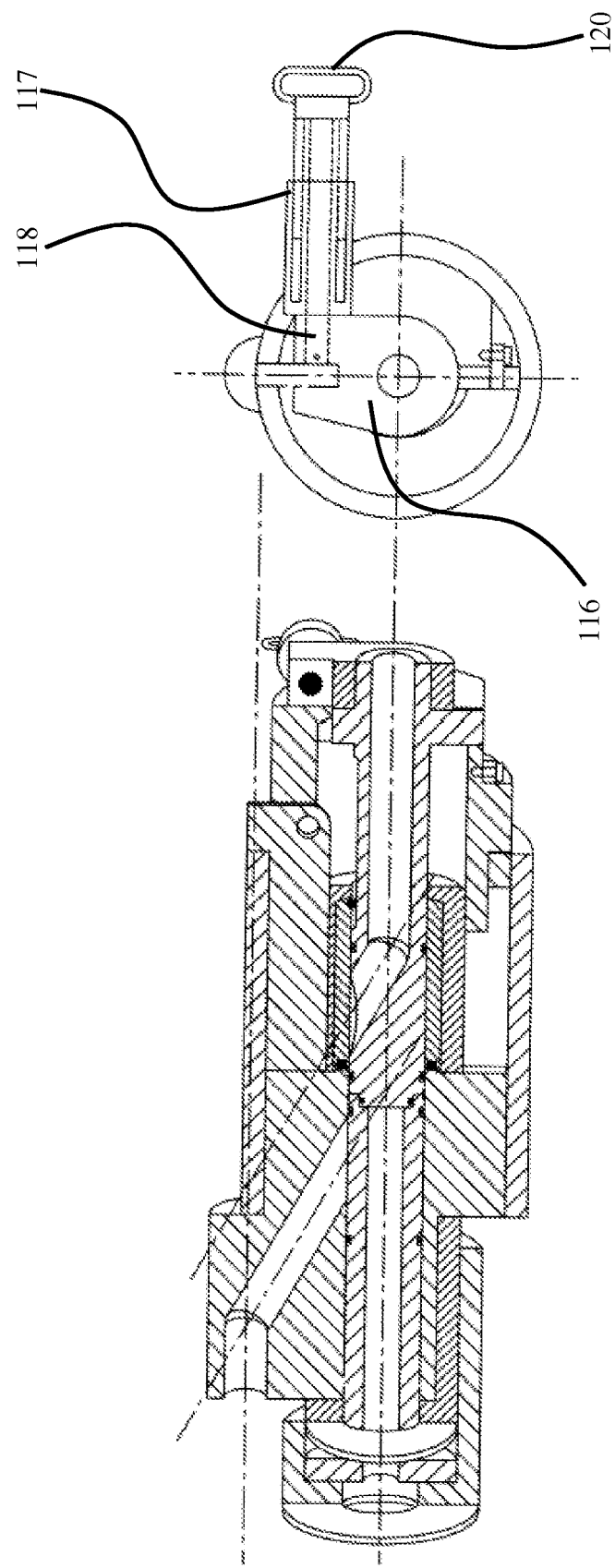
FIGS. 10a and 10b are respective sectioned perspective side and end views of a male and female member of the second embodiment in a coupled arrangement.

As shown in FIG. 9, the male member 104 also includes a breakout assembly 114. The breakout assembly 114 includes a body 116 that is attached fast to the male member 4 and arranged adjacent to the circumferential flange 42. FIG. 10b shows the breakout assembly in more detail. The body 116 includes a slot that is aligned with the slot 112 in the circumferential flange 14. An actuator 117 is attached to the body. The actuator controls a pin 118 (shown dotted in FIG. 8b). The pin extends through the actuator and through holes in the body either side of the slot. The pin can be removed from extending through the slot either by manually pulling the pin end 120 away from the actuator (for example by a Remotely Operated Vehicle) or by activating the actuator in order to withdraw the pin from the slot.

Figure 8B:
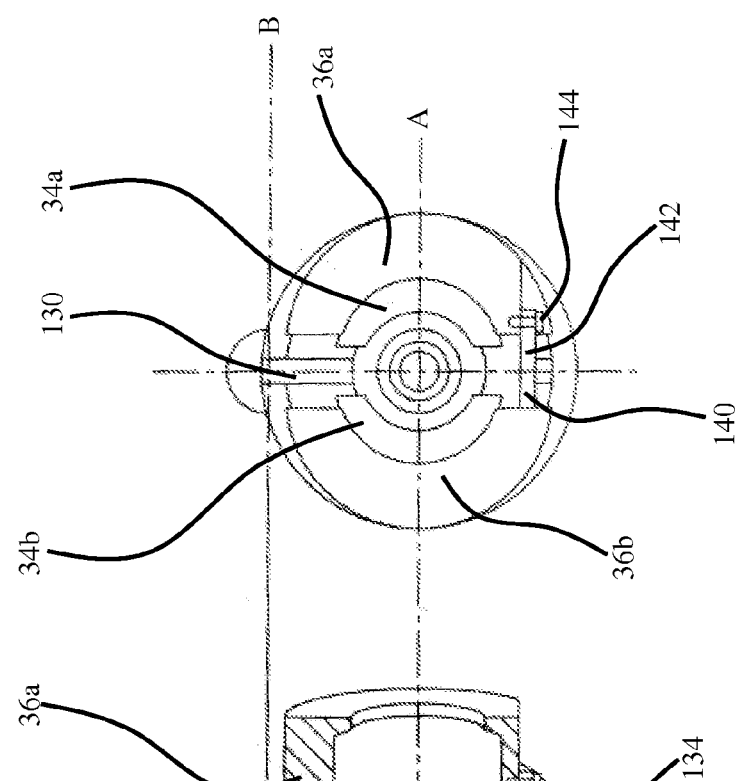
FIGS. 8a and 8b are respective sectioned, perspective side and end views of a female member according to the second embodiment.
Figure 8A:
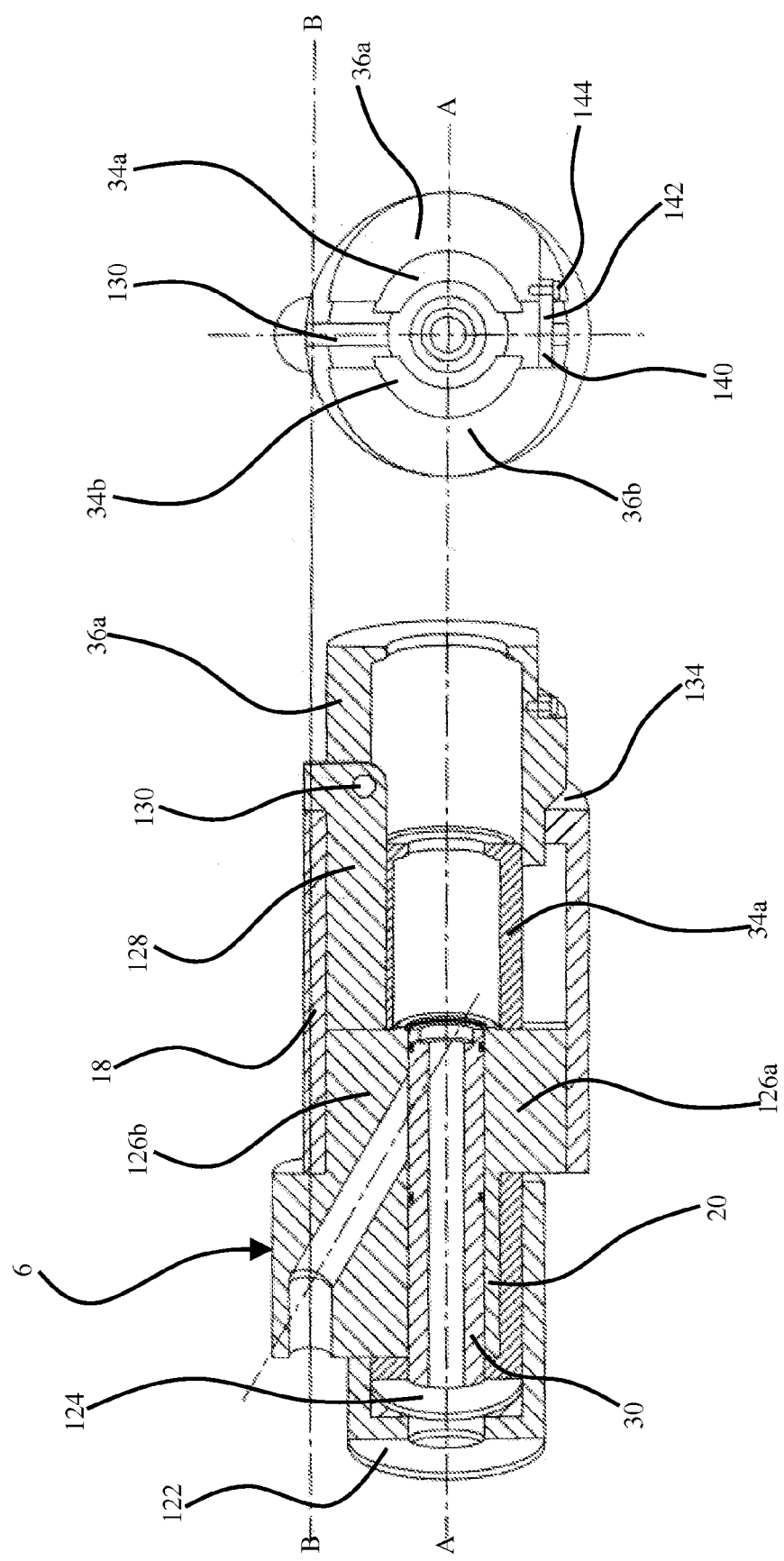

FIG. 8a shows the female member 4 according to the second embodiment. The female member 4 includes a body 6, a piston 30, an outer cage comprising two outer cages 36a and 36b (only 36a is visible in FIG. 8a), and an inner cage comprising two inner cages 34a and 34b (only 34a is visible in FIG. 8a). The female coupling member works substantially as herein described.

In the second embodiment however, rather than the inner and outer cages being biased to rotate towards the un-clamped position by a spring located to one side of a pivot point, the cages are biased to pivot towards an un-clamped position by leaf springs 122, 124. The inner and outer cages on this embodiment are biased in a similar way and for clarity only the leaf spring biasing the other cage will be described.

Figure 11:
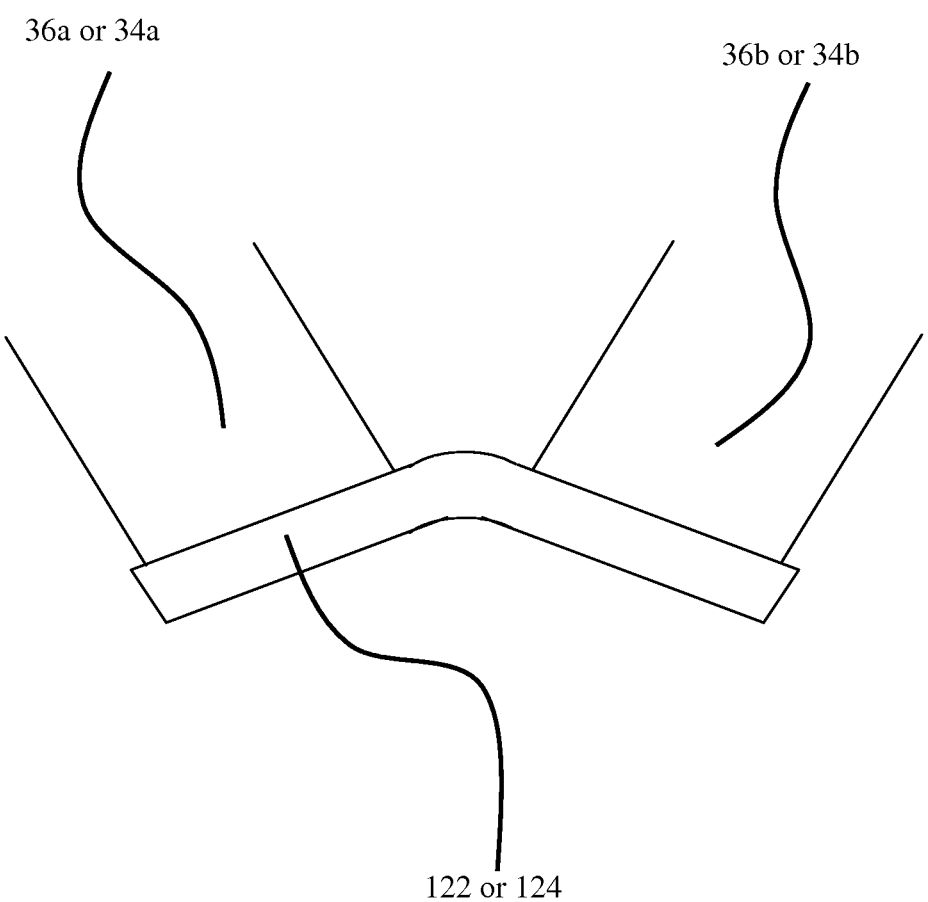
FIG. 11 is a side view of a leaf spring according to the second embodiment.

The leaf spring 122,124 is shown in FIG. 11 and comprises a circular leaf spring bent across its diameter to form a fold radius. The end of one outer cage 36a is attached to one half of the leaf spring 122 and the opposing outer cage 36b is attached to the other half of the leaf spring 122. As the outer cages are forced together, towards the clamped position, the leaf spring 122 deforms about its fold line towards a flat configuration. Due to the elastic properties of the leaf spring 122, the opposing outer cages are biased towards the un-clamped position.

The sprung washer 122, 124 is advantageous over the pivot and spring of the first embodiment because the pivot has been removed. In certain conditions, especially in underwater applications, pivots are susceptible to clogging by foreign articles. (i.e. grit).

Piston 30 includes a central through hole. As the probe is inserted into the socket, the through hole enables trapped fluid to be vented.

The external tube 18 (substantially as herein described) is shown attached fast to the body 6. The internal tube 20 is shown integrally formed with the body. Bridge sections 126a and 126b of the body connect the body 6 to tube 20.

According to the second embodiment, the body 6 also includes a guide 128. The guide comprises a plate 128 that is held fast to the external tube 18 and arranged axially. The plate includes a hole 130 arranged towards its free end and between the axis defined by the two fluid conduits (not shown) A-A and B-B.

When the male member is coupled with the female member, the plate 128 restricts the insertion unless the plate is aligned with the slot 112 in the circumferential flange of the male member. This thereby ensures the correct alignment of the probe within the socket. When coupled, the hole 130 is aligned with the pin 118. Accordingly, the pin 118 may be advanced through the hole 130. The pin providing breakout strength to the coupling, since, in order to decouple the male and female members the pin must now be overcome.

The pin can be removed in order to uncouple the members either by activating the actuator or by withdrawing the pin manually. Additionally, the pin may be arranged to shear if a sufficient breakout force is applied to the fluid conduits to pull the coupling apart. Because the pin is located in the centre of the two fluid conduit axes, minimal bending forces are created.

The guide plate 128 also provides torsional rigidity to the coupling, due to relative rotation between the male and female members being inhibited by abutment between the plate 128 and slot 112.

In the second embodiment, rather than the outer cages 36a and 36b including a frusto conical section, the closing of the outer cage towards the clamped position is achieved by a step in the external diameter of the ends of the outer cages and a sloped edge 134 adjoining the two diameters. As the outer cages are drawn into the outer tube, the sloped edge 134 engages an inner distal rim of the external tube 18, thereby closing the outer cage substantially as herein described.

The outer cage of the second embodiment also include a lock mechanism 140. The lock mechanism retains the two outer cages in their un-clamped position until the male member begins to couple with the female member. The lock mechanism comprises a latch 142 that is rotated about one end. The axis of rotation is parallel to the plane containing axis A-A and B-B. The pivot is attached to one of the outer cage 36a. The latch 142 is biased to rotate towards the outer cage 36b. Accordingly, when the outer cages are in the un-clamped arrangement, the latch rotates to brace the two members apart and thereby restrict their movement towards each other. As the male member is coupled with the female member, the male member abuts the latch and rotates it away from engagement between the outer cages 36a and 36b. Accordingly, the two cages become unlocked and may move towards each other thereby allowing the members to couple. As the members are coupled, the latch continues to rotate away from the piece 36b until it does not restrict the coupling. In this position, further rotation of the latch is delimited by abutment with a stop member or the outer cage 36a.

Accordingly, the latch acts as a brace to stop the two outer cages from moving towards each other. Consequently, because the outer cages cannot move towards each other, they cannot be drawn to the tube and in turn the piston cannot move within the socket. This is advantageous over the first embodiment as it stops accidental opening of the aperture in the socket. For example by the female coupling being dropped or knocked.

FIGS. 12 to 15b show a male member 4 and female member 6 of a valve assembly 2 according to a third embodiment. The third embodiment is substantially the same as the second embodiment, however, rather than the inner 34 and outer 36 cages being biased to rotate towards the unclamped position by leaf springs, each leaf spring of embodiment 2 is replaced by hoop springs 210a and 210b that bias the inner and outer cages apart and retainers 220a and 220b that restrain the inner and outer cages relative to the body 16 and piston 30. The inner and outer cages are biased and restrained in the same way. Accordingly, for conciseness, only the biasing of the inner cage is herein described.

The inner cage 34 is biased apart by a pair of opposed hoop springs 210a. The hoop springs 210a oppose each other, with one being on one side of the interface between the two inner cages and the other on the other side, in order to provide stability. Each hoop spring 210 comprises a resilient, elongate material bent in a middle portion about a radius. A first distal end of each hoop spring 210a is secured to the first inner cage 34a and a second, other distal end is secured to the other second inner cage 34b. For instance, the distal ends are secured in holes formed in the ends of each inner cage. Accordingly, the hoop springs connect the inner cages in a pivoting manor. Because each hoop spring 210 is resilient, it will be appreciated that they can be arranged to bias the inner cage 34 to move apart about the pivot point.

Figure 12A:
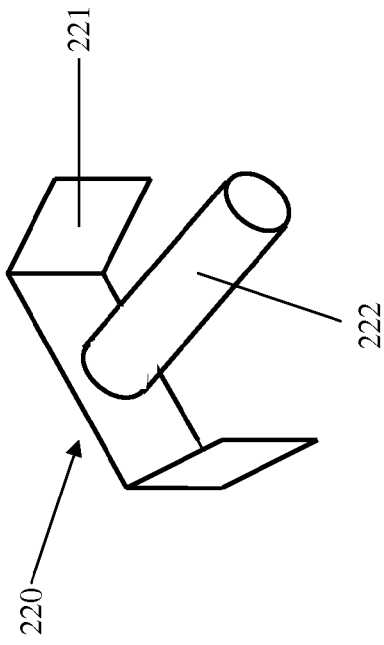
FIG. 12a is a perspective view of a retainer for use in a third embodiment.
Figure 12:
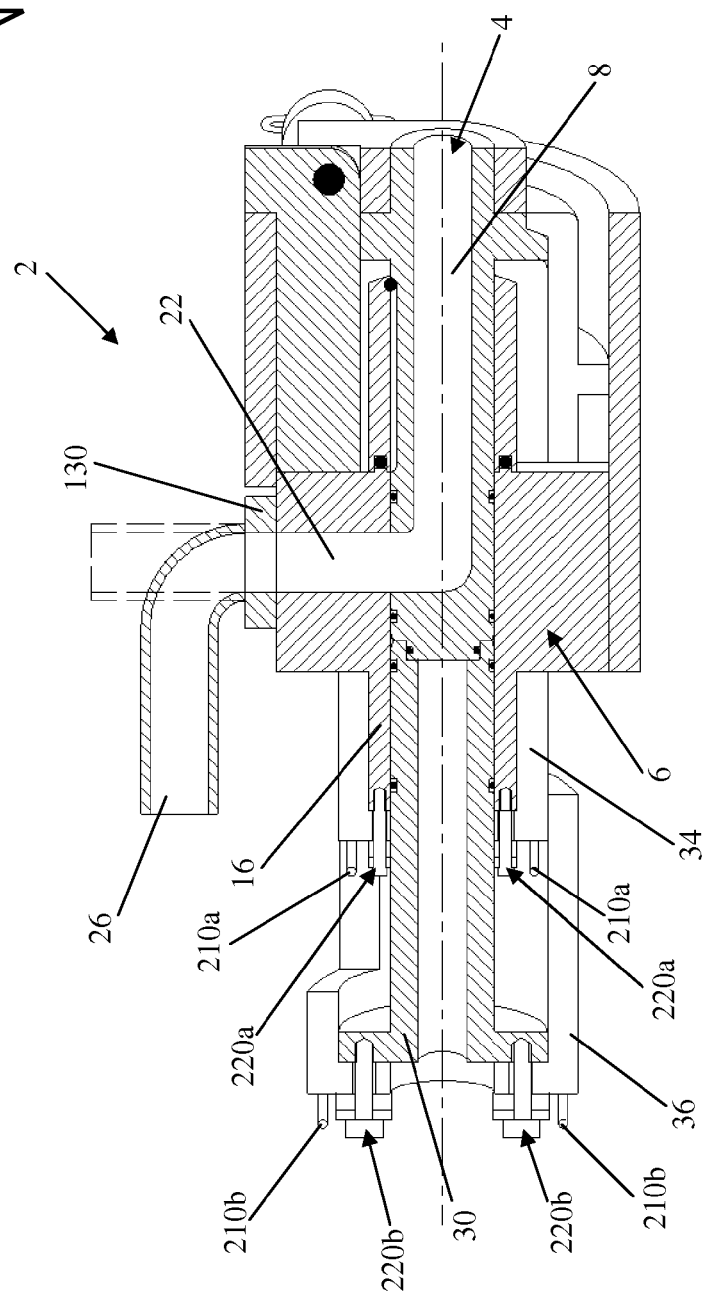
FIG. 12 is a sectioned side view of a coupling according to a third embodiment.
Figure 13:
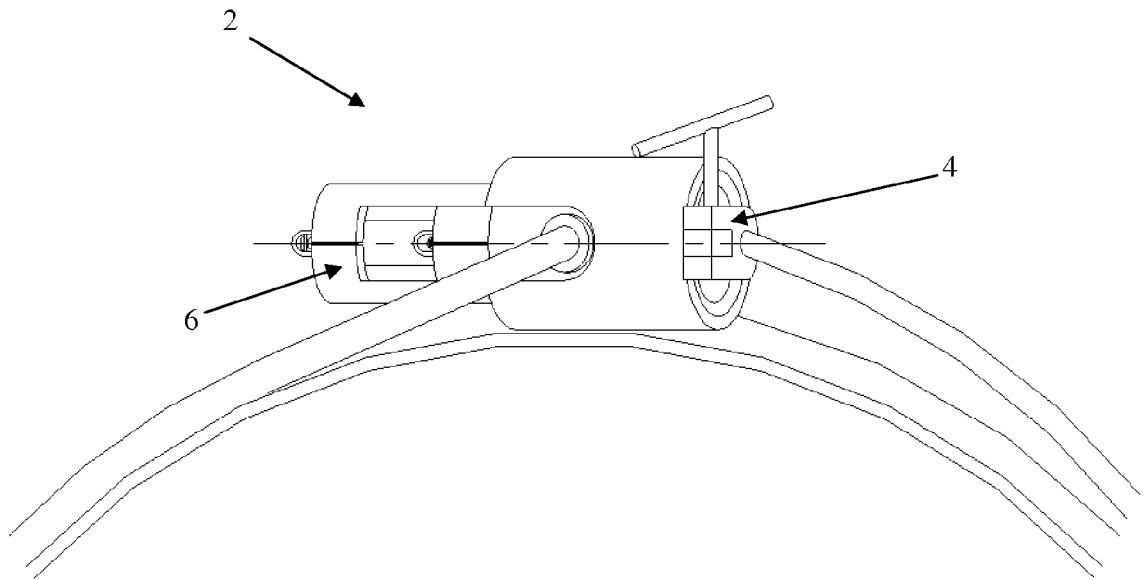
FIG. 13 is a perspective view of the coupling according to the third embodiment arranged on a chum.

The inner cage 34 is restrained to move relative to the body by a pair of retainers 220a. As with the hoop springs 210, the retainers oppose each other about the interface between the two inner cages. As shown in FIG. 12a, each retainer 220 comprises a resilient member 221 and a securing pin 222. The resilient member 221 is bent along two fold lines to create a trough like member. The securing pin 222 extends through an aperture in the member 221 and is secured to the back of the body. Accordingly, each securing pin 222 travels through a hole in the inner cage. In order to enable movement of the pin within the inner cage, the hole that the pin travels through is larger than the pin 222. Each end of the member 221 abuts the rear side of each opposing inner cage. Accordingly, the body is coupled to the inner cage. The retainers 220 flex in order to allow movement of the inner cages away from each other. It will be appreciated that a pair of retainers 220b restrain the outer cage to the piston 30 in a similar manor.

The hoop springs 210 and retainers 220 are advantageous as they remove the need for a pivoting connection between the cages 34 and 36 and between the cages and piston 30.

Pivoting connections have a tendency to cause problems in certain situations for instance when dirt or grit blocks the pivot. Furthermore, the cages 34 and 36 are biased towards the piston 30 and body 16 which improve the reliability of the coupling.

Figure 14:
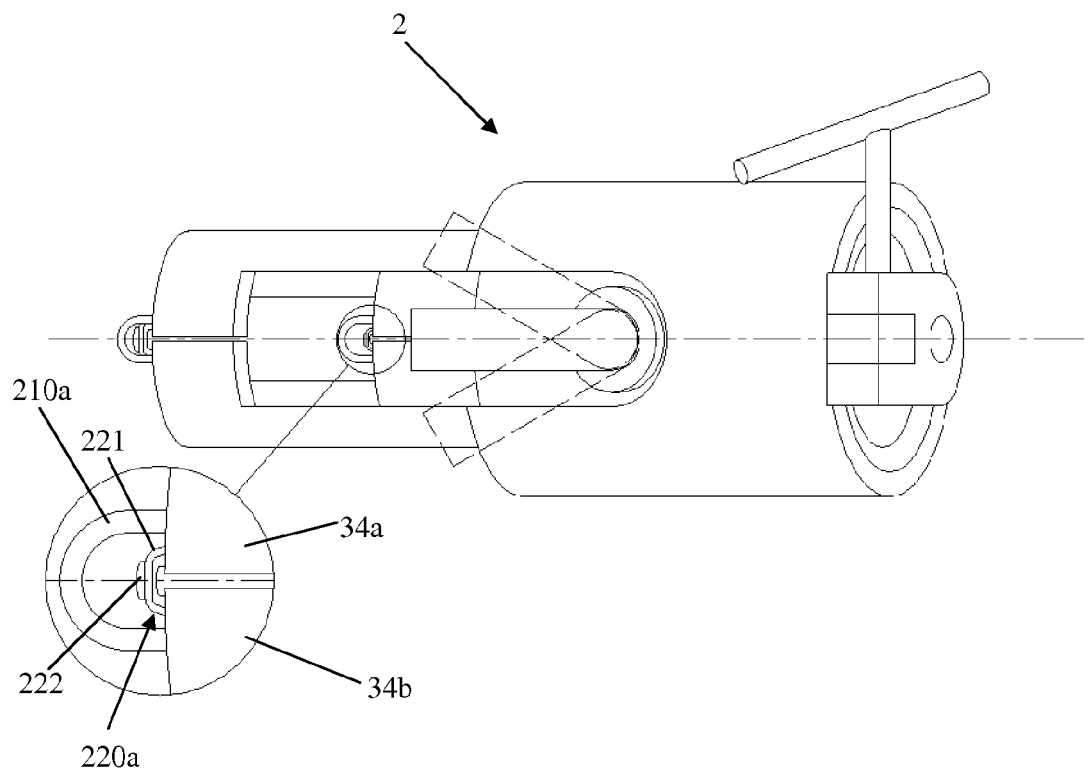
FIG. 14 is a top view of a coupling according to a third embodiment.
Figure 15A:
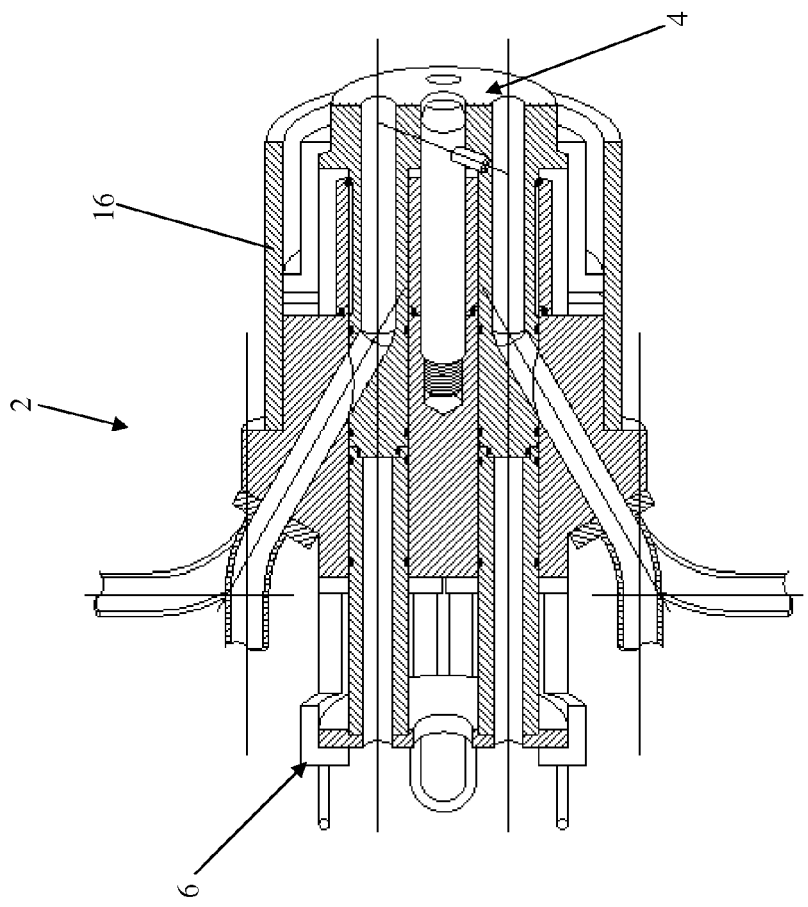
FIG. 15a is a sectioned, side view of a fourth embodiment of the present invention.
Figure 15B:
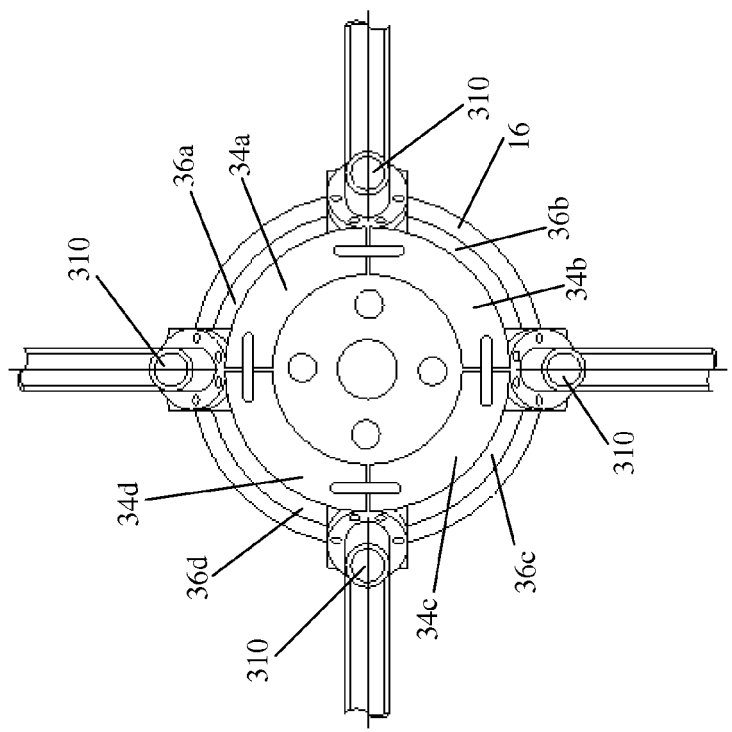
FIG. 15b is an end view of the fourth embodiment.

The third embodiment includes a further modification in that the fluid passage 22 through the female member is arranged to extend transversely to the flow of the fluid passage 8 in the probe. Furthermore, the female member includes a pivotable connection 130 so that, as shown in FIG. 14, the fluid conduit connection to the female member can pivot.

FIGS. 15a to 17 show a male member 4 and female member 6 of a valve assembly 2 according to a third embodiment. The third embodiment has been adapted to include the coupling having more than one fluid conduit. For instance as shown in the Figures the coupling includes four fluid conduits 310. Such a coupling may be used, for example, as an umbilical coupling in the oil industry.

Figure 17:
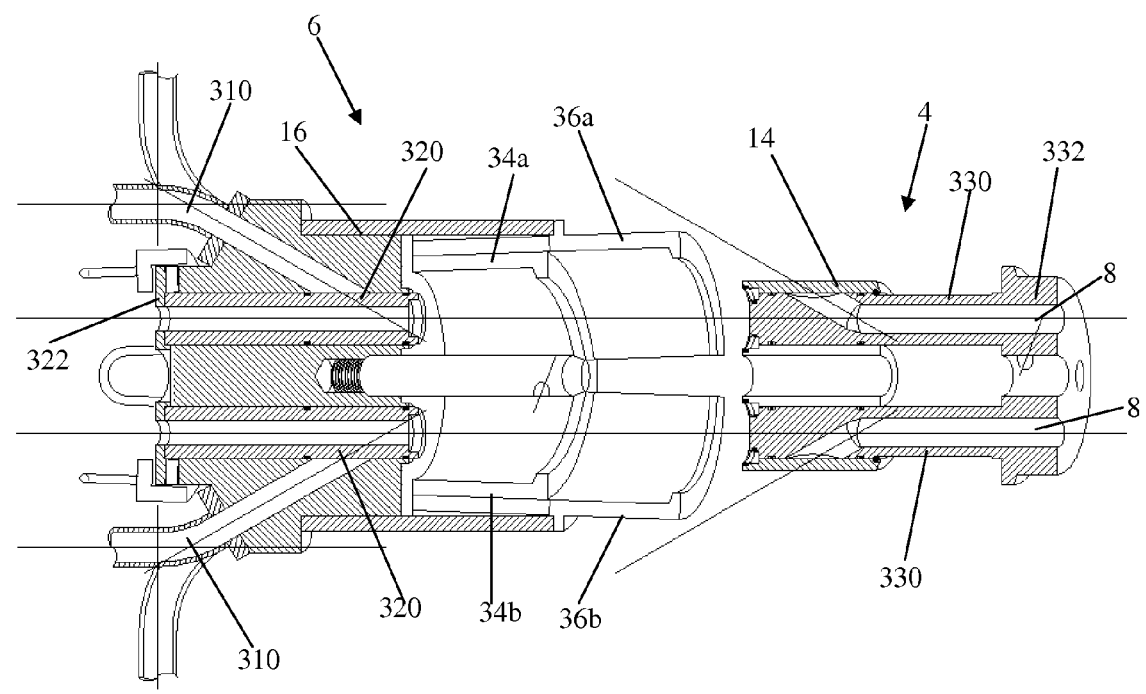
FIG. 17 is a sectioned side view of the fourth embodiment in a de-coupled position.

In order to adapt the coupling 2 to include four fluid passageways 310 it is necessary to split the outer cage 36 and inner cage 34 into four pieces. Referring to FIG. 17, the female member 6 includes four pistons 320 for closing each fluid passageway 310. The pistons 320 are connected together by a back plate 332 and therefore restrained to move together. The four pistons 320 operate to open and close each respective passageway 310 substantially as herein described.

The outer cage 36 is again required to carry the separation forces created during coupling and de-coupling in order to lock the pistons 320 to the probe 7. Since the fluid passageways require a path through the body, it is not possible for the outer cage 36 to comprise only two cages. Accordingly, as mentioned, the outer cage comprises four cages 36a, 36b, 36c and 36d. Each of the four outer cages are restrained relative to the back plate 322 of the pistons 320, and biased to separate as previously described. Consequently, and in accordance with previous embodiments, each of the outer cages are biased to move away from each other.

The male member 4 includes four probes 320 and a sheath 14. The sheath 14 is substantially a cylinder with four holes formed therethrough to accommodate each of the probes. The sheath closes the four fluid passageways 8 substantially as herein described. The four probes 330 are joined together by a plate 332. The plate 332 and sheath 14 also include a centre hole 334. When mated a rod 336 that extends from the female members body 16 enters the centre hole 334 such that the break out pin can be inserted through the plate 332 and a corresponding hole in the rod 336.

Figure 16:
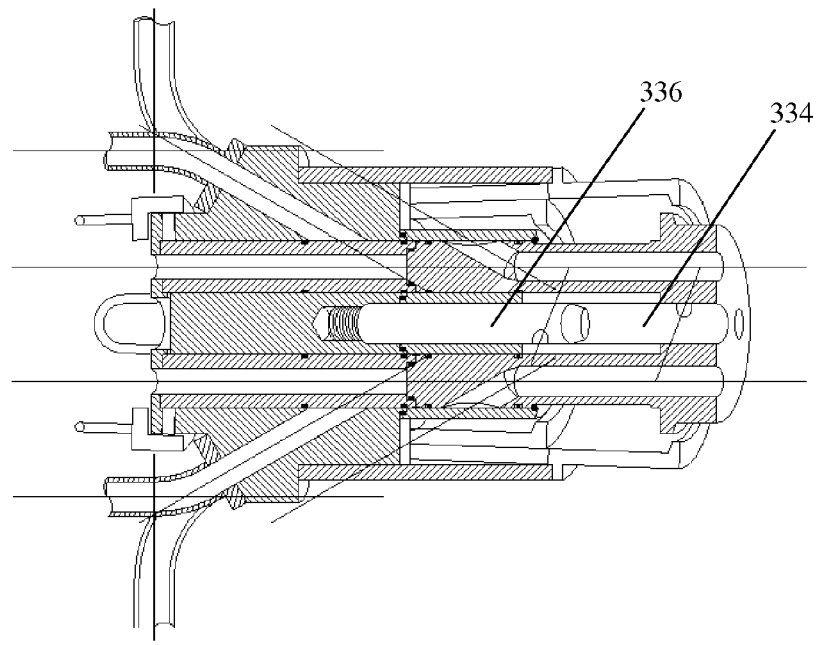
FIG. 16 is a sectioned side view of the fourth embodiment showing the coupling in an intermediate coupled arrangement.

As the male member 4 is inserted into the female member 6 each probe 330 abuts a corresponding one of the pistons 320 (see FIG. 16). Further insertion forces the pistons 320 to move relative to the body 16. Accordingly and as previously described, the outer cage 36 is withdrawn into the body 16 and each of the outer cages are forced to move towards each other to clamp the plate 332 and therefore the probes 330 to the pistons 320. In turn the inner cage also closes about the sheath 14. Accordingly, the multiple conduits of the coupling member can be mated and uncoupled in one movement without exerting any relative forces between the male and female members.

Whilst the third embodiment has been described incorporating four fluid passages it will be appreciated that any number of fluid passages may be incorporated by increasing the number of cage pieces for each respective outer and inner cage.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A valve assembly, comprising:
a male member including a probe with at least one first fluid passageway, wherein each first fluid passageway has at least one exit aperture on a side face of the probe; and
a female member including a socket for receiving the probe of the male member, the socket having at least one second fluid passageway wherein the or each second fluid passageway has at least one exit aperture arranged on an internal side face of the socket, at least one first closing member that is freely moveable between an open position in which the or each exit aperture is at least partially unobstructed and a closed position in which the or each exit aperture is fully obstructed, and a first securing means for releasably securing the first closing member to the probe in order to restrict relative movement between the first closing member and the probe;
wherein the male member includes a second closing member arranged about the probe that is movable between an open position in which each exit aperture of the probe is at least partially unobstructed and a closed position in which the or each exit aperture of the probe is fully obstructed, and wherein the female member includes a second securing means for releasably securing the socket to the second closing member in order to restrict relative movement between the socket and the second closing member, and wherein the first securing means or the second securing means comprises two or more parts wherein at least one part of each securing means is pivotal towards or away from the other in order to engage and disengage the probe or second closing means respectively.

2. The valve assembly as claimed in claim 1 wherein movement of the first closing member towards the open position causes the first securing means to engage the probe or causes the second securing means to engage the second closing member, and wherein movement of the first closing member towards the closed position causes the first securing means to disengage the probe and/or causes the second securing means to disengage the second closing member.

3. The valve assembly as claimed in claim 1, wherein the first or second securing means is secured relative to the first closing member or socket respectively in order to move with the first closing member or socket.

4. The valve assembly as claimed in claim 3, wherein the female member comprises a constant internal surface, said internal surface being fixed relative to the socket, and the first securing means having a section that includes a varying outside surface, wherein as the first securing means is moved relative to the internal surface, the internal surface contacts a different part of the varying outside surface.

5. The valve assembly as claimed in claim 1, wherein the parts of each of the first and second securing means are biased away from each other in order that the or each securing means is biased towards the disengaged arrangement.

6. The valve assembly as claimed in claim 1 in which each part of each of the first and second securing means is connected to each other by a pivot, the or each pivot being locked fast to the first closing member or socket in order to secure the first or second securing means to the first closing member or socket, and wherein the parts are biased by an elastic member arranged about the two parts and to one side of the pivot.

7. The valve assembly as claimed in claim 1 in which the parts of each of the first and second securing means are secured to the first closing member or socket respectively by at least one retaining member and biased apart by at least one resilient member.

8. The valve assembly as claimed in claim 1, wherein the second securing means is slidable relative to the first securing means.

9. The valve assembly according to claim 1, wherein each of the first and second securing means includes a lock to stop each closing member from moving towards the open position unless the male member is being inserted.

10. The valve assembly as claimed in claim 1 wherein the female member and male member are releasably interconnectable, the valve assembly being open and closed by coupling the male and female members such that when the male and female members are coupled fluid is able to pass between the two fluid passages.

11. The valve assembly as claimed in claim 1 wherein the female and male members include more than one fluid passageways and each passageway in the female member is opened and closed by a respective closing member and the male member includes the probe for each fluid passageway, wherein each of the first and second securing means comprise three or more parts that are moveable relative to each other in order to engage or disengage the respective parts.

12. A female coupling member which, with a male coupling member, forms a valve assembly comprising:
- a socket for receiving a probe of the male coupling member;
- at least one fluid passageway having at least one exit aperture arranged on an internal side face of the socket;
- a first closing member that is freely moveable between an open position in which the at least one exit aperture is at least partially unobstructed, and a closed position in which the at least one exit aperture is fully obstructed; and
- a first securing means for releasably securing the first closing member to the probe in order to restrict relative movement between the first closing member and the probe, and a second securing means for releasably securing the socket to a second closing member of the male coupling member in order to restrict relative movement therebetween, wherein the first or second securing means is secured relative to the first closing member or the socket respectively in order to move therewith;
- wherein the female coupling member comprises a constant internal surface, the internal surface being fixed relative to the socket, and the securing means having a section that includes a varying outside surface, wherein as the securing means is moved relative to the internal surface, the internal surface contacts a different part of the varying outside surface.

\* \* \* \* \*